United States Patent [19] [11] 4,428,503
Martin [45] Jan. 31, 1984

[54] VENDING MACHINE FOR INSURING THE DISPENSING OF NEWSPAPERS AND THE LIKE ONE AT A TIME

[75] Inventor: Dennis R. Martin, Saginaw, Mich.

[73] Assignee: Denmar Engineering & Control Systems, Inc., Saginaw, Mich.

[21] Appl. No.: 327,754

[22] Filed: Dec. 7, 1981

[51] Int. Cl.³ .............................................. B65G 59/02

[52] U.S. Cl. .................................... 221/232; 221/241; 221/279; 221/281

[58] Field of Search ............... 221/224, 226, 227, 230, 221/232, 236, 241, 238, 268, 270, 272, 276, 279, 221/281, 282

[56] References Cited

U.S. PATENT DOCUMENTS

| | | | |
|---|---|---|---|
| 2,423,621 | 7/1947 | Sabaitis | 221/272 X |
| 2,656,235 | 10/1953 | SeBastian | 221/232 X |
| 3,747,733 | 7/1973 | Knickerbocker | 221/281 X |
| 4,140,243 | 2/1979 | Etes | 221/227 X |
| 4,199,077 | 4/1980 | Lacewell | 221/213 |

*Primary Examiner*—Joseph J. Rolla
*Assistant Examiner*—Kevin P. Shaver
*Attorney, Agent, or Firm*—Learman & McCulloch

[57] ABSTRACT

A machine for vending newspapers and the like singly wherein a closed cabinet has an oblong dispensing opening in an upper portion of a side wall thereof. A newspaper supporting tray is mounted for vertical travel in the cabinet via the action of a spring and cable system which raises the newspaper stack progressively to dispose the topmost newspaper opposite the dispensing opening. A verticlly movable pushing finger assembly is mounted for vertical travel on a dispensing pusher frame which also includes a top stop for limiting upward travel of the stack.

5 Claims, 7 Drawing Figures

VENDING MACHINE FOR INSURING THE DISPENSING OF NEWSPAPERS AND THE LIKE ONE AT A TIME

BACKGROUND OF THE INVENTION

Vending machines for separating and dispensing newspapers from a stack thereof, one at a time, to customers, following the insertion of proper coins, are disclosed in various prior U.S. patents, including the following:

U.S. Pat. No. 4,174,047, Owens
U.S. Pat. No. 3,768,695, Pearson
U.S. Pat. No. 3,957,175, Gordon
U.S. Pat. No. 3,463,356, Gatti
U.S. Pat. No. 3,263,859, Searle
U.S. Pat. No. 3,180,518, Roser
U.S. Pat. No. 3,062,406, Kent et al.
U.S. Pat. No. 2,522,033, Graham To my knowledge these prior art machines have not appeared in the marketplace, or at least have not engendered any widespread acceptance anywhere. I believe that the reasons for this are that they have been too complex, cumbersome, and expensive to manufacture and service, and have not been trouble-free in their operation by customers who are rough and careless in handling them.

At the present time, there is a considerable need for an effective and economical machine of this character which will, in a trouble-free manner, reliably dispense newspapers one at a time. The most popular newspaper vending machine presently in use, insofar as I have been able to determine, is the coin-operated machine which opens a door in the cabinet and gives the customer access to the whole stack of newspapers. Since newspapers contain valuable coupons which are usable in various retail stores to obtain free merchandise and/or discounts or, in some cases, money premiums, the need for a vending machine which assures that a customer will only be able to obtain the single paper that he pays for is long standing and considerable.

A prime object of the invention is to provide a coin-operated vending machine which assures the engagement and dispensing of only a single newspaper or like item in response to each individual operation of the coin-operated mechanism, without in any way tearing or jamming the newspaper being dispensed, or the underlying newspaper.

Another object of the present invention is to provide a coin-operated machine of this character with modular components which can be readily and economically assembled, serviced, and repaired.

Another object of the invention is to provide a vending apparatus which discharges the item to be vended at a level adjacent the upper end of the machine and which has novel and improved mechanism for exerting a continuous upward pressure upon a stack of the newspapers to be vended.

Still another object of the invention is to provide a vending apparatus of the character described which is sufficiently versatile to dispense newspapers which, from day-to-day, may vary in thickness.

Still another object of the invention is to provide a vending machine of simple and economical construction which will operate in a trouble-free manner, and which is easily serviced in the sense of reloading the next day's newspapers to the machine.

SUMMARY OF THE INVENTION

With the foregoing objectives in mind, the machine of the present application is concerned with certain improvements which enable the machine to positively and reliably dispense a single newspaper at a time, without providing the operator access to the stack within the cabinet. The invention to be described herein includes an upright, closed cabinet with an oblong dispensing opening in a side wall thereof adjacent the upper end thereof, and preferably a transparent top cover which enables the customer to see whether the cabinet contains newspapers. A newspaper supporting tray is mounted in the cabinet to raise a newspaper stack progressively to bear against a guide which predisposes the topmost newspaper of the stack opposite the dispensing opening. To provide for automatically raising the stack, a sub-frame which has relative vertical movement with the elevator tray, is provided in the cabinet, and a spring and pulley system is so connected between the cabinet, the sub-frame and the tray, that the elevator tray is continuously biased upwardly in a trouble-free manner. A dispensing assembly is mounted adjacent the upper end of the cabinet and moved by a pusher frame from a rearmost position to a forward dispensing position. The ejecting finger is capable of vertical travel relative to the pusher frame to automatically drop from a raised position resting on top of the next paper to be dispensed during its retracting travel to a level opposite the end of the next paper to be dispensed, when the pusher frame reaches retracted position in the cabinet.

Other objects and advantages of the invention will be pointed out specifically or will become apparent from the following description when it is considered in conjunction with the appended claims and the accompanying drawings.

BRIEF DESCRIPTION OF THE DRAWINGS

FIG. 1 is a perspective elevational view of my improved vending machine for newspapers and the like;

DETAILED DESCRIPTION

Figure 1:
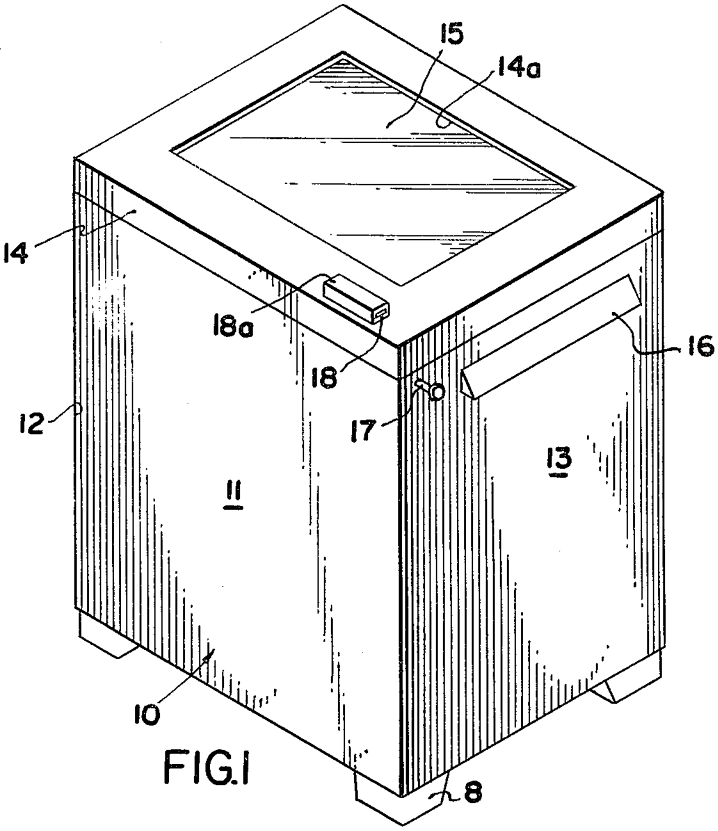

Referring now particularly to the accompanying drawings wherein the numerals designate the various parts to be described, the numeral 10 is utilized to generally indicate a cabinet, comprising a pair of side walls 11, a rear wall 12, and a front wall 13, the cabinet further including a bottom wall 9 mounted on pedestal legs, or the like 8.

Preferably the cabinet 10, while being of sturdy construction, will be economically formed of stamped sheet metal secured to an internal framework to be described. At the upper end of the cabinet, a cover 14 is provided which has a viewing opening 14a, closed with a non-breakable transparent sheet material 15 to enable the customer to see whether any newspapers are in the machine prior to inserting his coins, identify the newspaper and the date, and read the headlines. The cover 14 is hingedly mounted on the cabinet to swing to a vertical position, such that newspapers can be loaded to the cabinet via the upper end thereof. Provided on front wall 13 is a dispensing chute 16 communicating with the newspaper dispensing opening 16a in wall 13, and a pull rod 17, which is operable when proper coins have been inserted into coin opening 18 in coin receiver 18a to dispense a newspaper to chute 16. Suitable vertical framework members F are provided within the cabinet 10, as disclosed, and horizontal bottom and top frame members 19 and 20 are similarly provided to provide upper and lower box-like frames at the top and bottom of the cabinet, joined by the vertical frame members 18 at the corners.

Also provided within cabinet 10, preferably diagonally opposite one another for the sake of balance, are a pair of rods 21 which are secured between the fixed lower and upper frames 19 and 20. Provided on each fixed rod 21 is a sleeve 22 which is vertically movable on rod 21, and provided on each sleeve 22 is a second sleeve 23. A newspaper stack support tray 24 is fixed between the sleeves 23. A projecting member 25, fixed to each sleeve 23, has an eye-member 25a or the like for fixedly securing a cable 26, which is trained up over a pulley 27 on a pulley mount 27a extending from each sleeve 22.

At its opposite end, each cable 26 is secured to an eye member 26a which can be provided on one of the lower frame members 19. Each sleeve 22, at its lower end, mounts a projecting member 28, to which a coil spring 29 is attached, the opposite end of springs 29 being secured as at 30 to upper frame 20. In a manner which will be more particularly described later, the counterbalancing springs 29 urge the stack supporting tray 24 upwardly and must, of course, overcome the variable weight of the newspaper stack supported on tray 24 in order to do this.

Figure 2:
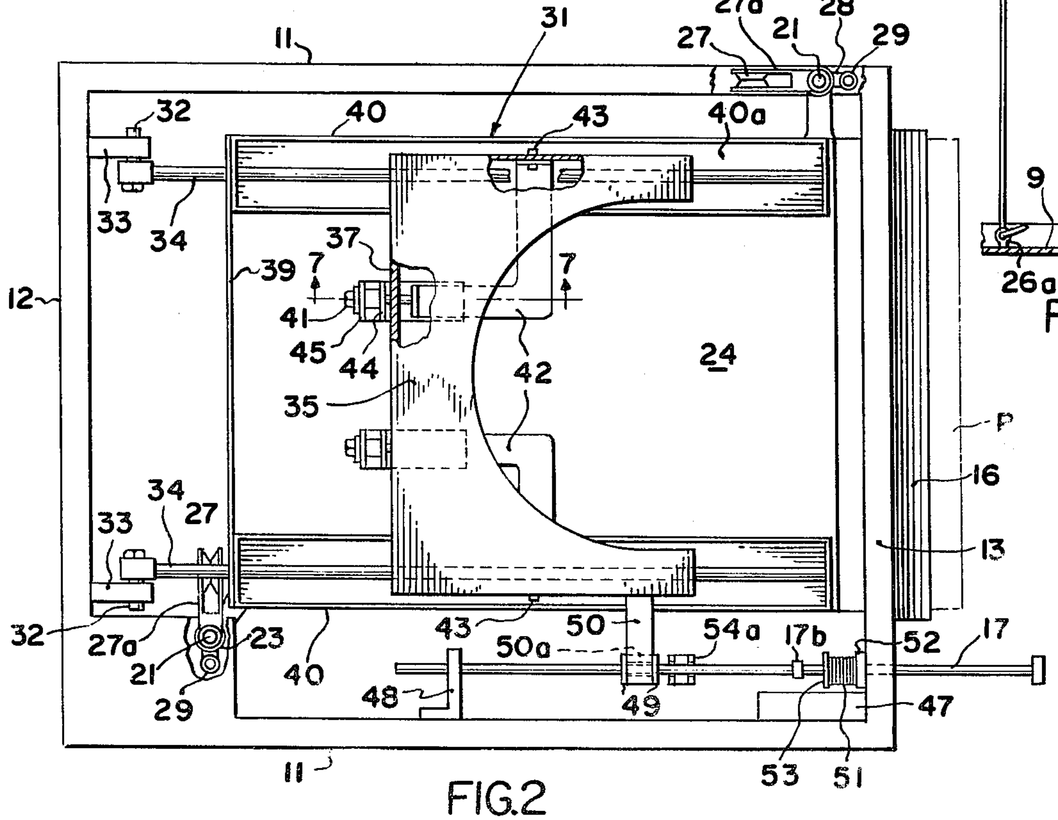
FIG. 2 is an enlarged, top plan view thereof, with the cover removed and the dispensing slide in retracted position.
Figure 4:
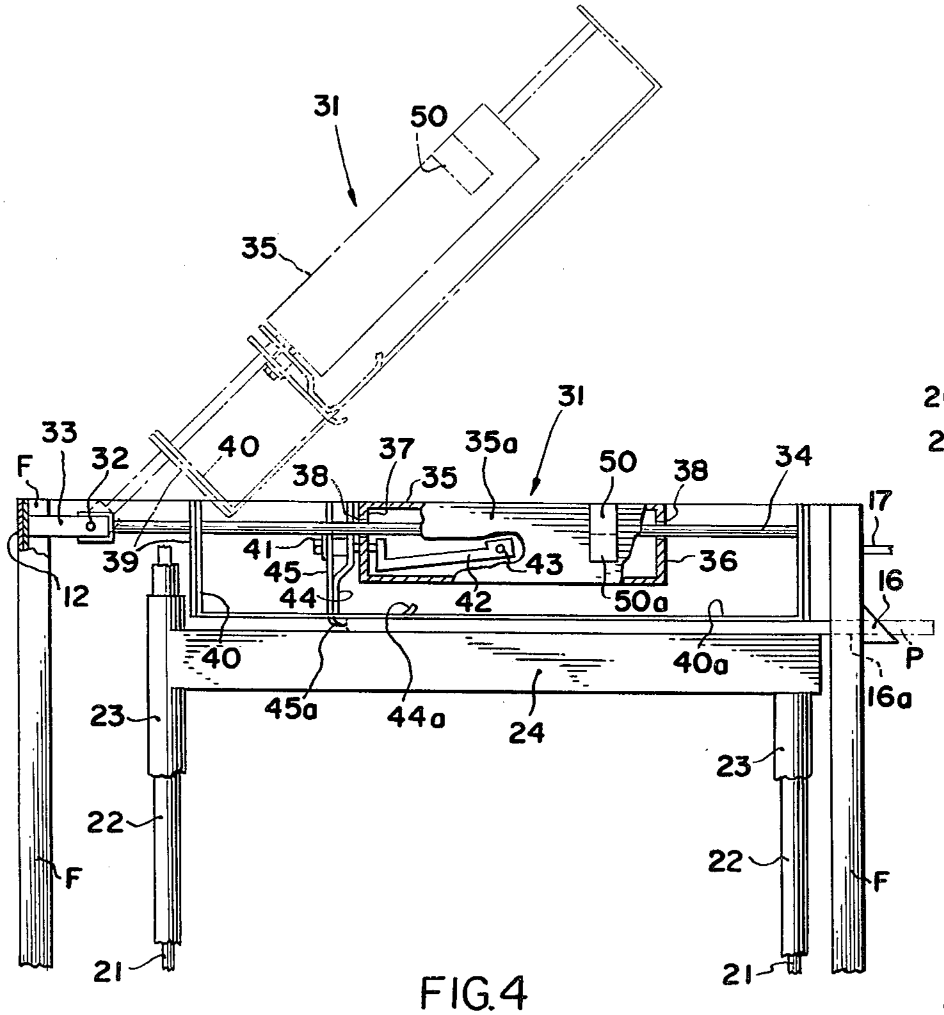
FIG. 4 is a fragmentary, sectional side elevational view of the upper end of the dispensing cabinet only, the diagrammatic lines indicating the dispensing assembly swung upwardly to a position which permits it to be adjusted or serviced.

As FIGS. 2 and 4 particularly illustrate, a dispensing assembly generally designated 31 is provided at the upper end of cabinet 10 and mounted for upward swinging movement about pivot pins 32 provided on cabinet-supported braces 33. The assembly 31 includes a pair of guide rods 34 on which a slide frame 35 is mounted for sliding travel, frame 35 having a pair of downwardly dependent front and rear flanges 36 and 37, respectively, provided with slide openings 38 for receiving rods 34.

The assembly 31 also includes an end wall 39, connecting the rods 34, and a pair of open top, elongate, rectangular frames 40, each having a lower wall 40a which constitutes an upper stop device for the newspaper stack. The walls 40a are engaged by the top newspaper of the stack when the assembly 31 is held in the horizontal position (as by locked cover 14) in which it is shown in solid lines in FIG. 4.

Figure 7:
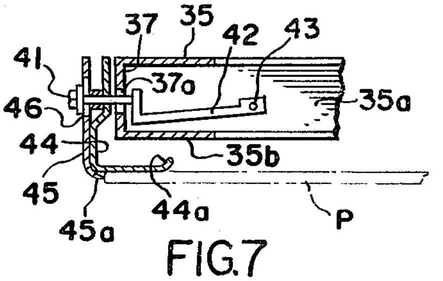
FIG. 7 is an enlarged sectional elevational view, taken on the line 7—7 of FIG. 2.

The pusher frame rear wall 37 is slotted as indicated in FIG. 7 at 37a, to receive bolts 41 at each end, each bolt 41 being fixed to an angle-shaped frame 42 pivoted at 43 to the depending side wall 35a of pusher frame 35. The bolts 41 mount an angle-shaped shoe 44 having an upturned end 44a, and a dependent ejecting finger bar 45 having a hooked-shaped end 45a, disposed at a spaced distance below the lower surface of shoe 44. Provided in finger 45, is a slot 46 to enable the relative position of the bars 44 and 45 to be adjusted according to the relative widths of the newspapers being dispensed weekly. Generally, the vertical spacing between shoe 44 and hook 45 is such that hook 45 will extend into approximately the middle of the normal thickness newspaper end. Then newspapers which vary in width from this, such as the Sunday newspaper, can also be accommodated. The lowermost position of the ejecting finger assembly is determined by the bottom 35b on pusher frame 35, the arms 42 being restrained from further downward pivoting movement thereby.

It is to be understood that a coin ejecting and operating mechanism which is conventional, and only schematically indicated here, as a box or assembly 47 is mounted adjacent one of the side walls 11, opposite the pull rod 17 and in communication with the dispensing end of the coin receiver 18a. As indicated, rod 17 is supported for slidable movement by the opening 16b in front wall 13 of the cabinet and by members such as bearings 48. Rod 17 includes spaced apart collars 49, and a strap 50 connected with slide frame 35 has a dependent fork 50a open at its lower end which receives the rod 17 so that movement of rod 17 forwardly, or to the right, in FIG. 2, will move the slide frame 35 forwardly. Fork 50a remains in embracing relationship with the rod 17 until it is desired to swing the dispensing finger assembly upwardly as illustrated in FIG. 4. A coil spring 51, mounted on rod 17 and bearing on a spring cup member 52 on front wall 13, and a collar 53 provided on push rod 17, returns the rod 17 to normal position when it is released by the customer. The pull rod 17 is normally prevented from operating by an upwardly extending bar 54, having an upwardly extending fork or clevis 54a which embraces a diametrically enlarged stop 17b on rod 17, the fork part 54a normally restraining movement of stop 17b and rod 17. The rear end of rod 17 is connected by a vertical bar 55 with a horizontal bar 56 and a dependent arm 57 which is pivoted to side wall 11 as at 58, for a purpose which will more particularly be described.

As indicated previously, the coin rejecting and/or accepting assembly 47 is a commercially available assembly manufactured by National Rejectors Industries (a division of UMC, Industries, Inc.) at Hot Springs, Arkansas. The mechanism may be the model No. 13-03-032 with an 01-15-022 rejector, and is illustrated generally in U.S. Pat. No. 3,768,695 and more particularly in the company's manual 1-15, 1-19 Series. It may be considered that the unit 47 includes a pivotally mounted actuator bar operated when the proper coins have been inserted to pull fork 54a down below the level of stop 17b and rod 17 and thereby release it for vending operation. When rod 17 is returned in the reverse direction, the arm 57 operates to reset the actuator bar, which moves the fork 54a back up into a position in which further operation of rod 17 is prevented until the proper coins are again inserted in coin slot 18 for a subsequent vending operation.

THE OPERATION

In operation, and assuming that a stack of newspapers is received on tray 24, the uppermost newspaper is engaged with the bars 40*a* and disposed in a position horizontally opposite dispensing chute 16. At this time, the rest shoe 44 will be on top of the paper to be dispensed, and the dispensing finger 45 will be engaged with the rear end of the paper to be dispensed. When proper coins are inserted into coin slot 18, the coin-operated mechanism 47 lowers arm 54 and fork 54*a* to permit the customer to pull rod 17 in a forward or outward direction. This pulls slide 35 forwardly such that dispensing member 45 pushes the paper P in a forward direction until it extends from the chute 16 and can be grasped by the customer, who then can pull the paper P the rest of the way out of the cabinet. The spring 51 will return the pull rod 17 in the rearward direction when the rod is released by the customer. At the time the folded newspaper P is being pulled out from under rest bar 44 in its movement out delivery chut 16, finger hook 45*a* is supported on the next newspaper in the stack, which maintained the arms 42 in the pivoted position. As the pusher assembly continued rearwardly, arms 45 proceeded rearwardly beyond the newspaper stack, and this permitted the finger assembly to drop downwardly, arms 42 pivoting downwardly about pivots 43 until shoes 44 were in engagement with the now uppermost paper P in the stack and ends 45*a* were rearwardly adjacent the end of that paper. Because the grasping fingers 44 and 45 are connected to pivot points 43 on the pusher frame 35, the whole weight of the pusher frame does not bear on the paper and chances of tearing or damaging the paper in the sliding movement described are minimized to the point where they are not of concern.

As indicated previously, retracting movement of the pusher frame 35 and rod 17 operates the reset lever 57 to place fork 54*a* in the "up" position and restrain any outward movement of rod 17 until fork 54*a* is again released by the insertion of new coins of proper value.

Figure 3:
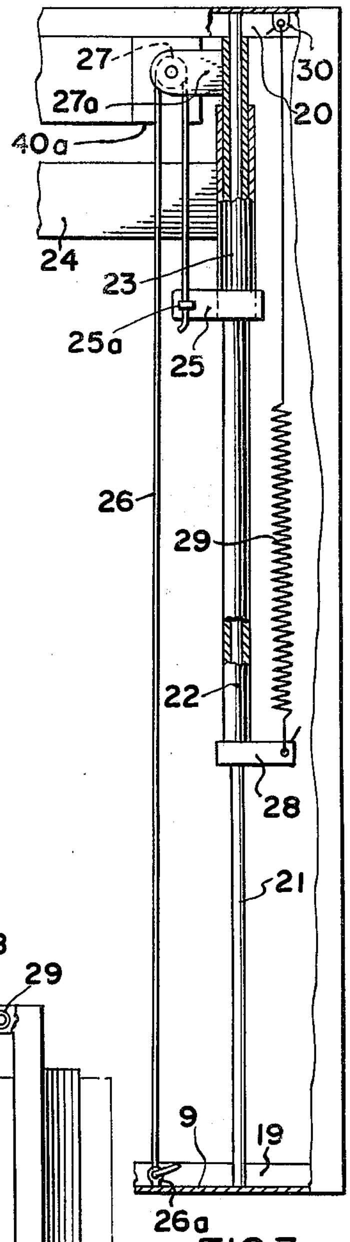
FIG. 3 is a fragmentary, sectional, elevational view illustrating the spring and pulley system for biasing the tray and showing the stack supporting tray in an upper position.
Figure 5:
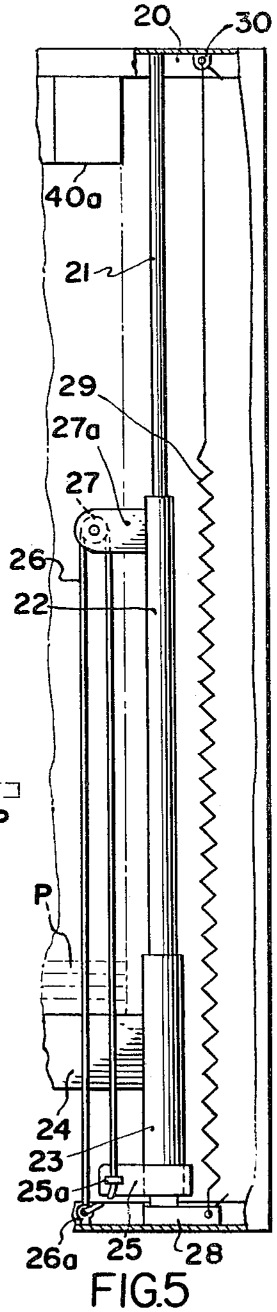
FIG. 5 is a view similar to FIG. 3, with the parts shown in a position in which the stack supporting tray is in a lowered position.
Figure 6:
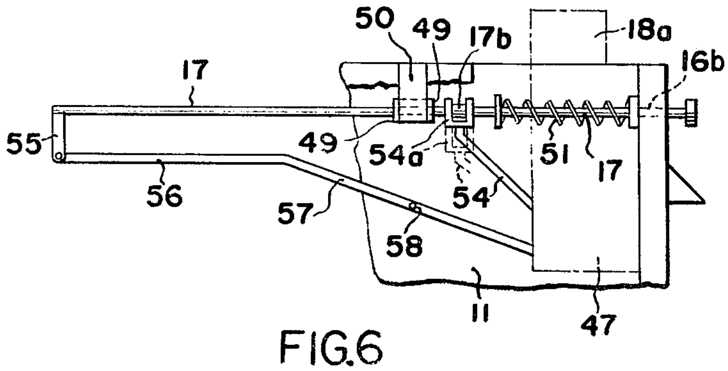
FIG. 6 is an enlarged, fragmentary, side elevational view illustrating mechanism for preventing the dispensing operation until proper coins are inserted in the machine, the push rod lock member being shown in retracted position.

Springs 29 can incrementally raise tray 24 from the lowermost position shown in FIG. 5, to the raised position shown in FIG. 3, as permitted by the removal of the newspapers, one by one, becaused pulleys 27 are mounted on the sleeve subframes 22 which are pulled upwardly by springs 29. When pulleys 27 are raised, cables 26 pull sleeves 23 and newspaper supporting platform 24 upwardly on sleeve subframes 22. Thus, platform 24 can have virtually a top to bottom of the cabinet range of vertical travel when subframes 22 are traveling around half the vertical height of the cabinet.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. In a machine for vending newspapers and the like singly and including:

a. a closed cabinet with upper, lower and side walls, and having an oblong dispensing opening in a side wall portion adjacent the upper end thereof;

b. a newspaper supporting tray mounted for vertical travel in the cabinet to raise a newspaper stack incrementally to dispose the topmost newspapaer of a stack opposite the dispensing opening;

c. a subframe mounted for vertical travel in the cabinet;

d. a vertically extending spring connected between the cabinet and subframe to urge the subframe to topmost position;

e. a system mounted on the subframe and having a cable connected at one end to the cabinet, trained around a rotary member on the subframe, and connected at its opposite end to the tray whereby movement of the spring biased subframe can be much less than the movement of the tray while biasing the tray via the subframe to topmost position with the spring stretched only part way as far as would be required if it were attached to the tray.

2. The improved combination of claim 1 wherein a fixed guide extends vertically in said cabinet, said subframe comprises a first sleeve mounted for vertical travel on said guide, and said tray includes a second sleeve mounted for vertical travel on the first sleeve.

3. The improved combination of claim 1 wherein the cable is connected to the lower end of the cabinet and the rotary member comprises a pulley connected to the upper end of the first sleeve.

4. In an improved machine for vending newspapers and the like singly and including:

a. a closed cabinet with upper, lower and side walls, and having an oblong dispensing opening in a side wall portion adjacent the upper end thereof;

b. a newspaper supporting elevator tray mounted for vertical travel in the cabinet to raise a newspaper stack progressively to dispose the topmost newspaper of a stack opposite the dispensing opening;

c. means connected to counterbalance the weight of the stack and urge the elevator tray to topmost position;

d. a dispenser assembly mounted within the cabinet at the upper end thereof and including a pusher frame mounted for reciprocatory sliding travel in a substantially horizontal plane toward and away from said dispensing opening;

e. actuator means connected with said pusher frame for effecting movement thereof;

f. an ejecting finger assembly carried by the pusher frame at the rear end thereof remote from the dispensing opening, and including a shoe for engaging the top surface of a newspaper to be dispensed from the stack, and a dependent finger rearward thereof and at a spaced distance therebelow for engaging the rear edge of the newspaper and moving it forwardly when the pusher frame is moved forwardly;

g. and means pivotally mounting the finger assembly on the pusher frame in a manner to permit a limited vertical travel thereon such that the finger can drop to a level opposite the rear edge of the next newspaper to be dispensed on the retract stroke of the pusher frame, the finger asssembly being fixed to elongate arms extending forwardly thereof and said arms being pivoted to said pusher frame at their front ends near the front of the pusher frame; and flange means on the pusher frame in the downward path of travel of the arms and limiting maximum downward movement thereof.

5. In an improved machine for vending newspapers and the like singly and including:

a. a closed cabinet with upper, lower and side walls, and having an oblong dispensing opening in a side wall portion adjaent the upper end thereof;

b. a newspaper supporting elevator tray mounted for vertical travel in the cabinet to raise a newspaper stack progressively to dispose the topmost newspaper of a stack opposite the dispensing opening;

c. means connected to counterbalance the weight of the stack and urge the elevator tray to topmost position;

d. a dispenser assembly mounted within the cabinet at the upper end thereof and including a pusher frame mounted for reciprocatory sliding travel in a substantially horizontal plane toward and away from said dispensing opening;

e. actuator means connected with said pusher frame for effecting movement thereof;

f. an ejecting finger assembly carried by the pusher frame at the rear end thereof remote from the dispensing opening, and including a shoe for engaging the top surface of a newspaper to be dispensed from the stack, and a dependent finger rearward thereof and at a spaced distance therebelow for engaging the rear edge of the newspaper and moving it forwardly when the pusher frame is moved forwardly;

g. and means pivotally mounting the finger assembly on the pusher frame in a manner to permit a limited vertical travel thereon such that the finger can drop to a level opposite the rear edge of the next newspaper to be dispensed on the retract stroke of the pusher frame, said dispenser assembly including a frame with rear to front extending guide members on which the pusher frame is mounted for forward and retracting travel; the frame being mounted for upward movement to clear the upper end of the cabinet for the reception of a stack of newspapers; and horizontal surfaces on said frame serving as locator stops above the tray to limit upward travel of the newspaper stack and stack supporting tray.

* * * * *